July 8, 1941.   M. DUCKSTEIN   2,248,568
ADDITIONAL LUBRICATING DEVICE FOR AIRCRAFT ENGINES
Filed Nov. 16, 1939
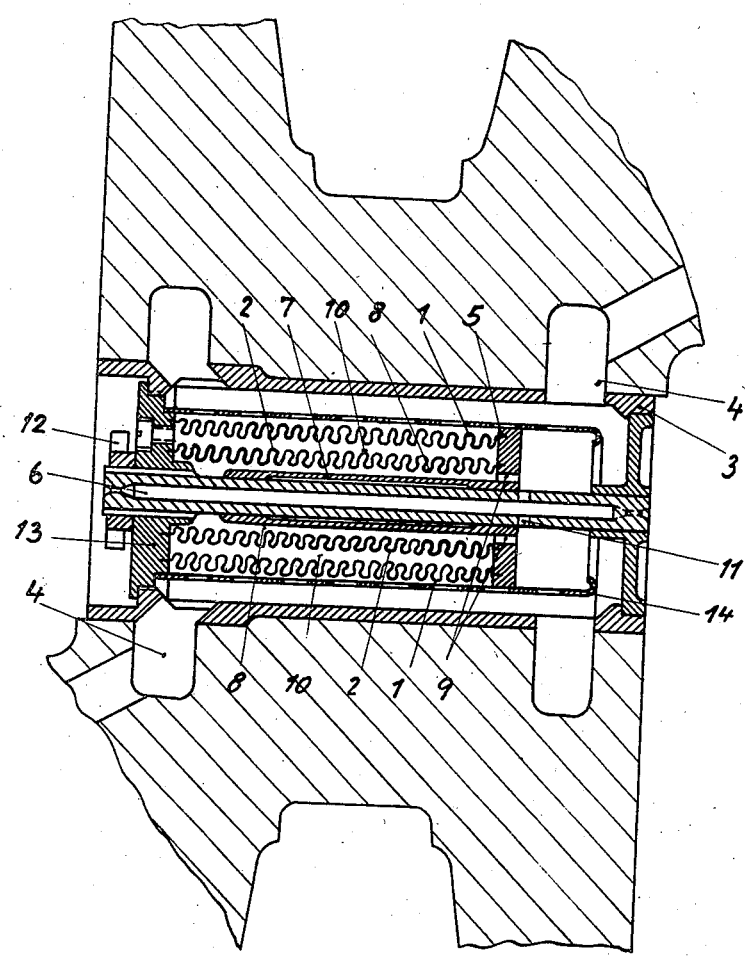
INVENTOR:
MARTIN DUCKSTEIN
ATTORNEYS Patented July 8, 1941

2,248,568

UNITED STATES PATENT OFFICE 2,248,568

ADDITIONAL LUBRICATING DEVICE FOR AIRCRAFT ENGINES

Martin Duckstein, Obermenzing, Munich, Germany, assignor to B M W Flugmotoren Gesellschaft m. b. H., Munich, Germany, a company of Germany Application November 16, 1939, Serial No. 304,732
In Germany November 19, 1938

15 Claims. (Cl. 123—196)

This invention relates to an additional lubricating device for aircraft engines, and more particularly to a device mounted in the hollow pivot of the crank shaft for spraying oil into the crank case of a radial engine.

An object of this invention is to insure an adequate supply of oil at all times to the cylinder running surfaces and bearing points of an engine.

Another object of this invention is to insure an adequate supply of oil to the cylinder running surfaces and bearing points of an engine, when the engine is cold.

Still another object of this invention is to insure an adequate supply of oil to the cylinder running surface and bearing point of an engine during the starting of the engine.

An additional object of this invention is to provide a supplemental supply of oil to the cylinder running surfaces and bearing points of an engine during starting, by an arrangement which may be added in addition to the normal lubricating system.

A further object of this invention is the provision of a fluid dispensing device in which the amount of fluid dispensed is dependent upon the temperature of the fluid itself.

A more specific object of this invention is the provision of an non-clogging supplemental lubricating system for the cylinder running surfaces and bearing points of an engine, which is variable in accordance with the temperature of the lubricating oil.

With the foregoing and other objects in view which will appear as the description proceeds, the invention resides in the combination and arrangement of parts and in the details of construction hereinafter described and claimed.

The invention has been illustrated in its preferred embodiment in the accompanying drawing, wherein:

The single figure is a cross-sectional view of an additional lubricating device illustrated in the hollow pivot of an engine crank shaft.

The free ends of the corrugated tubes 1, 2, which are fitted in the cover 13 of the casing 3 inserted in the crank pivot are closed by the disc 5. The casing 3 communicates with the general lubricating oil circulation by means of bores 4. The sleeve 7 is guided on the nozzle carrying and outwardly leading tube 6 to the largest possible extent, and serves at the same time to guide the corrugated tubes 1 and 2, which are connected with the sleeve 7 by means of a disc 5. The sleeve 7 is located in the space 8, limited by the inner corrugated tube 2 and the disc 5. The space 8 is filled with oil at the prevailing operating pressure through the bores 9 in the disc 5. By this arrangement the space 10 which is enclosed by the corrugated tubes and filled preferably with a liquid of, if possible, a high coefficient of expansion, is surrounded by pressure oil in such a manner that the corrugated tubes are not submitted to any pressure and only respond to variations in temperature. For the modification of the cross-sectional passage area, radial bores 11 are provided in the tube 6 carrying the nozzle, which bores are covered or exposed by the outer edge of the disc 5, thus regulating the throughflow of pressure oil to the nozzle. For the initial adjustment of the regulating device for the delivery of the necessary quantity of oil at a predetermined oil temperature, the tube 6 carrying the nozzle and fitted into the casing wall is displaced in longitudinal direction by turning it and is locked in its place by a check nut 12.

The initial adjustment of the regulating device is such that in the case of cold oil the maximum throughflow necessary is exposed. As the oil is heated up, the corrugated tubes 1 and 2 in consequence of the heating expand with the enclosed thermo-responsive liquid, and displace the disc 5, whereby the bores 11 are more or less closed by the disc according to the movement and thus the oil throughflow to the tube carrying the nozzle becomes less. The device acts in the reverse manner on a reduction in temperature of the lubricating oil, so that by the regulating, according to the invention, the additional lubrication is correctly influenced, as in the case of cold oil more lubricant is supplied, and in the case of hot oil less lubricant.

To make it unnecessary to remove the whole casing fitted in the crank pivot in case of trouble such as a clogged nozzle or incorrect response of the thermostat, the measuring box as well as the nozzle carrying tube are preferably fixed to a removable cover 13. The cover 13 may be provided at the same time with a lattice 14, which protects the corrugated tubes of thin sheet metal against shocks and blows, i. e., against every unforeseen contact.

This invention may be utilized with special advantage for double-bank radial engines in which the casing carrying the regulating device is located in the divided central pivot of the crank shaft, as the nozzle carrying tube 6 may be replaced by a tube with two nozzles, shown in the drawing in broken lines and thus only one packing is necessary for both nozzles.

It will be obvious to those skilled in this art that the device according to the present invention is much more reliable than other devices which have heretofore been proposed. For example, in those cases where a thermostat has been used to vary the discharge from a nozzle by means of a cone, trouble has been experienced by a wedging of the cone, thus resulting in either too much or too little oil and destroying the entire function of the device. Similar trouble has been experienced where the thermostat is connected with a movable hollow pivot provided with radial bores. In the present case, due to the equalization of pressure upon the thermostat and the relatively simple action of the controlling sleeve, a smooth and efficient working of the device at all times has been secured. It will be seen therefore, that I have provided a device which fulfills the object primarily stated, and while I have shown a single embodiment of my invention, it is clear that other forms thereof may readily be provided without departing from my invention as defined in the claims which follow.

I claim:

1. In an engine, a crank shaft having a hollow pivot, a casing mounted within said pivot, a hollow tube having an outwardly leading nozzle at one end thereof mounted within said casing, said tube being provided with a radial bore, a sleeve slidably mounted on said tube, means for supplying a lubricant to within such casing, and means responsive to the temperature of said lubricant for varying the position of said slidable sleeve along said tube to control the opening of said radial bore, whereby the flow of lubricant from said casing through said bore, tube and outwardly through said nozzle is dependent upon the temperature of said lubricant.

2. The combination according to claim 1, in which said temperature responsive means is mounted within said casing co-axially to said tube.

3. The combination according to claim 1, in combination with a covering at one end of said casing through which said nozzle projects, and a disc connected to said sleeve, and in which said temperature responsive means comprises a pair of corrugated tubes arranged one within the other, co-axially to said tube, and connected at one end to said cover and at the other end to said disc, the closed space between said tubes being filled with a thermo-responsive liquid.

4. The combination according to claim 1, in combination with a covering at one end of said casing through which said nozzle projects, and a disc connected to said sleeve, and in which said temperature responsive means comprises a pair of corrugated tubes arranged one within the other, co-axially to said tube, and connected at one end to said cover and at the other end to said disc, the closed space between said tubes being filled with a thermo-responsive liquid, and said disc being provided with a bore to permit passing of the lubricant into the space within the inner tube.

5. The combination according to claim 1, in combination with a cover inserted into one end of said casing, and a substantially cylindrical protecting lattice connected to said cover within said casing, and about said tube, sleeve and temperature responsive means.

6. In a radial engine, a crank shaft having a hollow pivot, a casing mounted within said pivot, a cover inserted in one end of said casing, a hollow tube having a nozzle at one end thereof, adjustable means for mounting said tube on said cover within said casing, said tube being provided with a radial bore, a sleeve slidably mounted on said tube, means for supplying a lubricant to within said casing, and means responsive to the temperature of said lubricant for varying the position of said slidable sleeve along said tube to control the opening of said radial bore, whereby the flow of lubricant from said casing through said bore, tube and outwardly through said nozzle is dependent upon the temperature of said lubricant.

7. In a double-bank radial engine, a crank shaft having a hollow central pivot, a casing mounted within said pivot, a hollow tube having an outwardly leading nozzle at each end thereof mounted within said casing, said tube being provided with a radial bore, a sleeve slidably mounted on said tube, means for supplying a lubricant to within said casing, and means responsive to the temperature of said lubricant for varying the position of said slidable sleeve along said tube to control the opening of said radial bore, whereby the flow of lubricant from said casing through said bore, tube and outwardly through said nozzle is dependent upon the temperature of said lubricant.

8. A fluid controlling device comprising, in combination, a casing, a hollow tube having an outwardly leading nozzle at at least one end thereof mounted within said casing, said tube being provided with a radial bore, a sleeve slidably mounted on said tube, means for supplying a fluid to within said casing, and means responsive to the temperature of said fluid for varying the position of said slidable sleeve along said tube to control the opening of said radial bore, whereby the flow of fluid from said casing through said bore, tube and outwardly through said nozzle is dependent upon the temperature of said fluid.

9. The combination according to claim 8, in which said temperature responsive means is mounted within said casing co-axially to said tube.

10. The combination according to claim 8, in combination with a covering at one end of said casing through which said nozzle projects, and a disc connected to said sleeve, and in which said temperature-responsive means comprises a pair of corrugated tubes arranged one within the other, co-axially to said tube, and connected at one end to said cover and at the other to said disc, the closed space between said tubes being filled with a thermo-responsive liquid.

11. The combination according to claim 8, in combination with a covering at one end of said casing through which said nozzle projects, and a disc connected to said sleeve, and in which said temperature responsive means comprises a pair of corrugated tubes arranged one within the other, co-axially to said tube, and connected at one end to said cover and at the other end to said disc, the closed space between said tubes being filled with a thermo-responsive liquid, and said disc being provided with a bore to permit passing of the liquid into the space within the inner tube.

12. The combination according to claim 8, in combination with a cover inserted into one end of said casing, and a substantially cylindrical protecting lattice connected to said cover within said casing and about said tube, sleeve, and temperature responsive means.

13. In a radial engine, a crank shaft having a hollow pivot, a hollow cylindrical casing mounted within said pivot, closure means for the end of said casing, a hollow tube extending co-axially to said cylindrical casing and projecting beyond the closure means at both ends, said tube being formed with a nozzle at at least one projecting end thereof and with a radial bore intermediate its length, a sleeve slidably mounted on said tube, a disc having a longitudinal bore therethrough mounted on one end of said sleeve, a pair of corrugated tubes arranged one within the other, coaxially to said hollow tube and connected at one end to one of said closure means and at the other end to said disc outside of said longitudinal bore, and a thermo-responsive liquid in the space between the corrugated tube, and means for supplying a lubricant to within said casing and about said corrugated tubes, whereby a change in temperature of said lubricant expands or contracts said tube to move said disc and sleeve to control the flow of lubricant to said radial bore and thence through said tube and nozzle.

14. The combination according to claim 13, in combination with a protecting lattice connected to said one closure means and extending about said corrugated tubes, sleeve, disc, and hollow tube.

15. The combination according to claim 13, in which said hollow tube is slidably mounted in said closure means, in combination with means for adjustably fastening said tube relatively to said closure means and said casing.

MARTIN DUCKSTEIN.